United States Patent
Iijima et al.

(10) Patent No.: US 8,055,368 B2
(45) Date of Patent: Nov. 8, 2011

(54) CONTROL DEVICE AND CONTROL METHOD OF PLASMA PROCESSING SYSTEM, AND STORAGE MEDIUM STORING CONTROL PROGRAM

(75) Inventors: Kiyohito Iijima, Nirasaki (JP); Hiroaki Mochizuki, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 240 days.

(21) Appl. No.: 12/496,137

(22) Filed: Jul. 1, 2009

(65) Prior Publication Data

US 2010/0010658 A1 Jan. 14, 2010

(30) Foreign Application Priority Data

Jul. 11, 2008 (JP) ................................ 2008-181700

(51) Int. Cl.
G06F 19/00 (2011.01)

(52) U.S. Cl. .......................... 700/105; 700/100; 700/121
(58) Field of Classification Search .................. 700/100, 700/105, 108, 121
See application file for complete search history.

(56) References Cited

U.S. PATENT DOCUMENTS

| 5,812,403 | A  | * | 9/1998  | Fong et al. .................... 700/121 |
| 6,258,610 | B1 | * | 7/2001  | Blatchford et al. ............. 438/14 |
| 6,350,697 | B1 | * | 2/2002  | Richardson et al. .......... 438/710 |
| 6,616,759 | B2 | * | 9/2003  | Tanaka et al. .................... 118/63 |
| 6,828,165 | B2 | * | 12/2004 | Tanaka et al. ................... 438/14 |
| 7,292,906 | B2 | * | 11/2007 | Funk et al. ..................... 700/121 |
| 7,425,510 | B2 | * | 9/2008  | Kim ............................. 438/706 |
| 2004/0173311 | A1 | * | 9/2004 | Ichimaru et al. ......... 156/345.27 |
| 2005/0189320 | A1 | * | 9/2005 | Ichimaru et al. ................. 216/59 |
| 2007/0215180 | A1 | * | 9/2007 | Iijima ............................. 134/18 |

FOREIGN PATENT DOCUMENTS

JP 9-129529 5/1997

* cited by examiner

*Primary Examiner* — Charles Kasenge
(74) *Attorney, Agent, or Firm* — Oblon, Spivak, McClelland, Maier & Neustadt, L.L.P.

(57) ABSTRACT

In a control device of a plasma processing system, a storage unit is configured to store a reference recipe indicating an order of the plasma processing. An operation unit calculates a state variation value of each of the plasma processing devices by a predetermined timing at a plurality of processing lot intervals. A table generation unit generates an adjusting table for adjusting the reference recipe from the calculated state variation value of each of the plasma processing devices. In addition, a process executing control unit adjusts the reference recipe by using one of the generated adjusting tables for the plasma processing devices by the table generation unit and performs the plasma processing on the target object in the corresponding plasma processing device according to an order of the adjusted reference recipe.

10 Claims, 12 Drawing Sheets

FIG. 5

ADJUSTMENT

REFERENCE RECIPE   300

| PROCESS MODULE | STEP 1 | STEP 2 | ... |
|---|---|---|---|
| RF(w) | 1000 | 1000 | |
| PRESSURE(mT) | 125 | 125 | |
| ETCHING TIME | ... | ... | |
| GAS AMOUNT | ... | ... | |

(0~5000W)

ADJUSTING TABLE   310

| PROCESS MODULE | VALUE |
|---|---|
| RF | +10% |
| PRESSURE | +20% |
| ETCHING TIME | −5% |
| GAS AMOUNT | ... |

AO PARAMETER TABLE   320

| PROCESS MODULE | MAX | MIN | OFFSET |
|---|---|---|---|
| RF(w) | 80000 | 0 | 0 |
| PRESSURE(mT) | ... | ... | ... |
| ETCHING TIME | ... | ... | ... |
| GAS AMOUNT | ... | ... | ... |

(0~5V)

⇨ OUTPUT DATA
(INSTRUCT TO PERFORM PROCESS)

FIG.12

ADJUSTING TABLE 310a1

| PROCESS MODULE | VALUE |
|---|---|
| PRODUCT A GROUP | |
| RF | |
| PRESSURE | |
| ETCHING TIME | |
| GAS AMOUNT | |

310a2

| PROCESS MODULE | VALUE | |
|---|---|---|
| PRODUCT A GROUP | STEP 1 | |
| RF | 1000 | |
| PRESSURE | 125 | |
| ETCHING TIME | ⋮ | |
| GAS AMOUNT | ⋮ | |

310a3

| PROCESS MODULE | VALUE | |
|---|---|---|
| PRODUCT A GROUP | STEP 1 | STEP 2 |
| RF | 1000 | 1000 |
| PRESSURE | 125 | 125 |
| ETCHING TIME | ⋮ | ⋮ |
| GAS AMOUNT | ⋮ | ⋮ |

CONTROL DEVICE AND CONTROL METHOD OF PLASMA PROCESSING SYSTEM, AND STORAGE MEDIUM STORING CONTROL PROGRAM

CROSS-REFERENCE TO RELATED APPLICATIONS

This document claims priority to Japanese Patent Application No. 2008-181700, filed on Jul. 11, 2008, the entire content of which are hereby incorporated by reference.

FIELD OF THE INVENTION

The present invention relates to a control device and a control method of a plasma processing system, which performs a predetermined treatment on a target object, and a storage medium storing control program, more particularly to adjustment of recipes.

BACKGROUND OF THE INVENTION

A semiconductor manufacturing factory increases the entire processing efficiency and improves the productivity by arranging a plurality of plasma processing devices and enabling the plasma processing devices to simultaneously perform desired plasma processing of target objects.

The plasma processing devices are managed by a control device. The control device performs the plasma processing of target objects, e.g., product wafers (or referred to as wafers) in processing spaces on the basis of the processing orders indicated in a plurality of recipes by managing the recipes corresponding to the plasma processing devices (see, e.g., Japanese Patent Laid-open Publication No. H9-129529.

Various kinds of gas are used in the plasma processing device. If a plasma etching device, however, uses fluorocarbon processing gas, a resist used as an etching mask and/or wearable parts such as a focus ring are eroded and by-products are produced. Some by-products are not exhausted and are gradually attached and accumulated on the inner wall of a processing space as organic materials. Such accumulation changes the state of the processing space.

Even though the etching is performed according to the processing order of the recipe identically to the previous time, it is undesirably impossible to obtain the same result as the previous time and a desired characteristic from the processed wafer if the state of the processing space is changed. Accordingly, the following methods have been discussed. One method inserts a test wafer for measuring etching characteristics into intervals of the successive processing of wafers on a regular basis to measure any change in the state of processing space. Another method changes the recipe according to the etched results of wafers and adjusts etching characteristic deviations of wafers within a preset range.

When the recipe is changed according to the state of the processing space, however, it is troublesomely required to individually manage the recipes corresponding to the respective plasma processing devices although the same processing is performed in the plasma processing devices.

In addition, each of the plasma processing devices does not always perform the same processing. A plurality of kinds of processing may be performed in the same processing space. In this case, it is necessary to individually manage as many recipes as the number of kinds of the processing that can be performed by the respective plasma processing devices. For example, when each of the 10 plasma processing devices can perform 10 kinds of the processing in the manufacturing factory, if the recipe is changed according to the state of the processing spaces of the respective plasma processing devices, it is required to manage 100 (i.e. 10 kinds×10 devices) recipes. Especially, today's manufacturing factory has become bigger and the number of the plasma processing devices being installed has become increasing, thereby making it more bothersome and difficult to manage the corresponding recipes.

SUMMARY OF THE INVENTION

In view of the above, the present invention provides a control device and a control method of a plasma processing system, which simplifies the management of recipes, and a storage medium storing control program.

In accordance with an aspect of the present invention, there is provided a control device of a plasma processing system, which performs plasma processing on target objects in processing spaces of a plurality of plasma processing devices, including: a storage unit, configured to store a reference recipe indicating an order of the plasma processing; an operation unit, configured to calculate a state variation value of each of the plasma processing device by a predetermined timing at a plurality of processing lot intervals; a table generation unit, configured to generate an adjusting table for adjusting the reference recipe from the calculated state variation value of each of the plasma processing devices,; and a process executing control unit, configured to adjust the reference recipe by using one of the generated adjusting tables for the plasma processing devices by the table generation unit and to perform the plasma processing on the target object in the plasma processing device according to an order of the adjusted reference recipe.

In this case, the state variation of the plasma processing device is calculated by a predetermined timing at a plurality of processing lot intervals. The adjusting table is on a basis of the calculated result. The adjusting table is used to adjust the reference recipe, and the target object is plasma-processed on a basis of the order of the adjusted reference recipe. Accordingly, the state variation of the respective plasma processing devices may desirably adjusted by using the adjusting table, and the reference recipe may desirably have no change. As a result, the control device may desirably manage one reference recipe in the same processing. This makes it possible to reduce the process load of the control device, and thus the recipe can be easily managed or maintained.

In accordance with another aspect of the present invention, there is provided a control method of a plasma processing system, which performs plasma processing of target objects in processing spaces of a plurality of plasma processing devices, including: storing a reference recipe indicating an order of the plasma processing in a storage unit; calculating a state variation value of the plasma processing device by a predetermined timing at a plurality of processing lot intervals; generating an adjusting table for adjusting the reference recipe from the calculated state variation value of each of the plasma processing devices; and adjusting the reference recipe by using one of the generated adjusting tables for the plasma processing devices and performing the plasma processing of the target object in the plasma processing device according to an order of the adjusted reference recipe.

In accordance with yet another aspect of the present invention, there is provided a storage medium storing a computer-executable control program of a plasma processing system, which performs plasma processing of target objects in processing spaces of a plurality of plasma processing devices, including: processes of storing a reference recipe indicating an order of the plasma processing in a storage unit; calculating a state variation value of the plasma processing devices by a predetermined timing at a plurality of processing lot intervals; generating an adjusting table for adjusting the reference recipe from the calculated state variation value of each of the plasma processing devices,; and adjusting the reference recipe by using one of the generated adjusting for the plasma processing devices and performing the plasma processing of the target object in the plasma processing device according to an order of the adjusted reference recipe.

BRIEF DESCRIPTION OF THE DRAWINGS

The objects and features of the present invention will become apparent from the following description of embodiments, given in conjunction with the accompanying drawings, in which:

FIG. 5 shows how adjustment of recipes is performed by an adjusting table in accordance with the first embodiment of the present invention;

FIG. 12 shows another example of the adjusting table.

DETAILED DESCRIPTION OF THE EMBODIMENT

Figure 1:
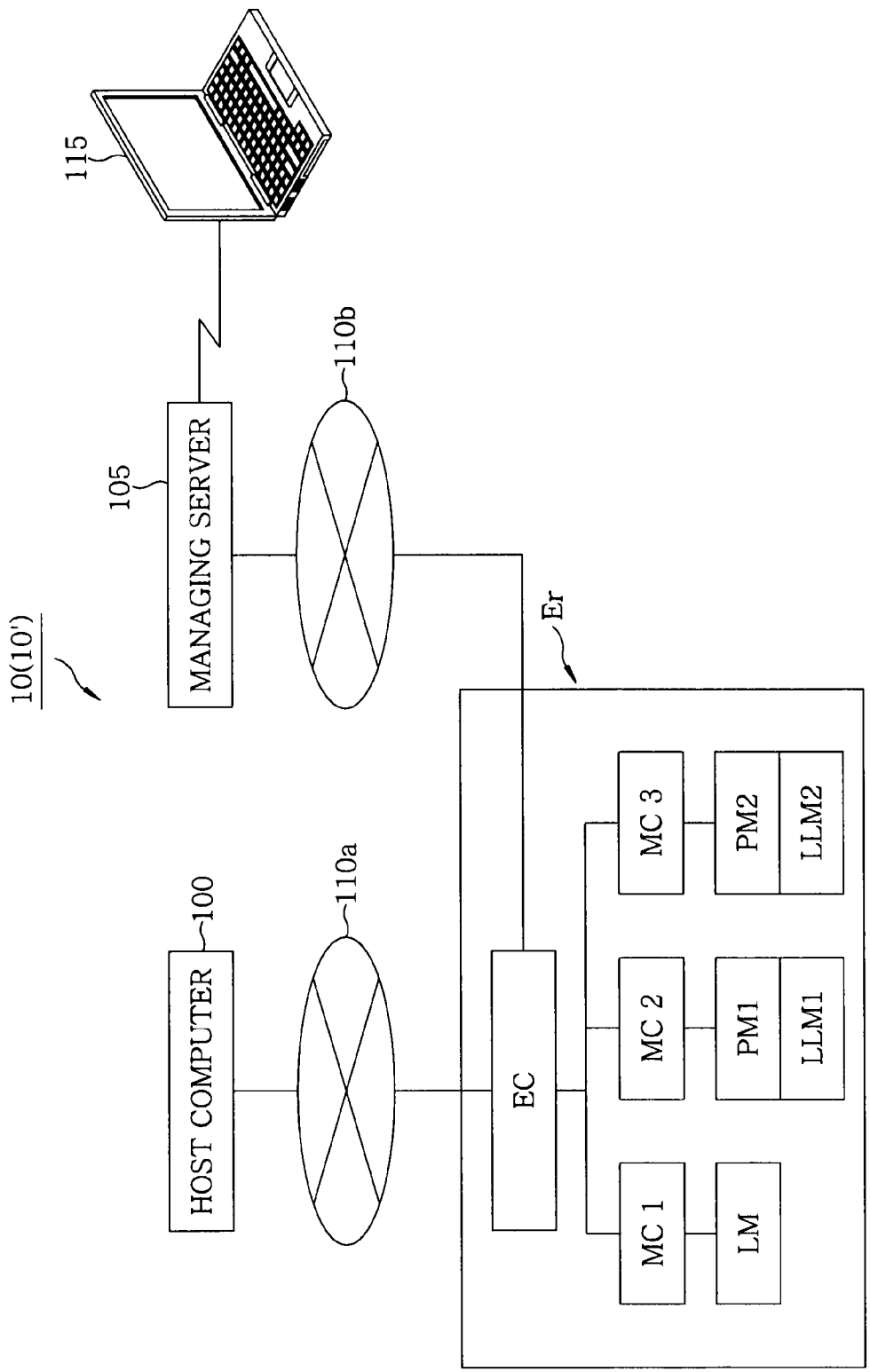
FIG. 1 shows a plasma processing system in accordance with first and second embodiments of the present invention.

Embodiments of the present invention will be described with reference to the accompanying drawings. Further, in the following description and drawings, components having substantially the same configuration and function are denoted by like reference characters, and thus redundant description thereof will be omitted herein.

(First Embodiment)

Firstly, a plasma processing system 10 in accordance with a first embodiment of the present invention will be described with reference to FIG. 1. The plasma processing system 10 etches a silicon wafer (or referred to as a wafer) W and performs cleaning between the etching processes. Alternatively, the plasma processing system 10 may perform seasoning instead of the cleaning or perform the seasoning as well as the cleaning. The etching is performed according to the order of a recipe. Here, the cleaning refers to the treatment of cleanly stabilizing a processing space (or chamber) by removing the deposits, caused by the plasma processing, in the processing space with, e.g., $O_2$ plasma. The seasoning refers to the treatment of stabilizing the temperature of the processing space or the state of the deposits by performing a certain plasma processing.

(Plasma Processing System)

The plasma processing system 10 includes a host computer 100, a managing server 105, an equipment controller EC, three machine controllers MC1 to MC3 (or collectively referred to as MC), two process modules PM1 and PM2 (or collectively referred to as PM), two load lock modules LLM1 and LLM2 (or collectively referred to as LLM), and a loader module LM.

The equipment controller EC is connected to the host computer 100 and the managing server 105, respectively, via client's local area networks 110a and 110b. The managing server 105 is connected to a personal computer (PC) 115. The host computer 100 manages the entire system such as data management and the like. The managing server 105 sets operational conditions of the respective components according to data transmitted from the PC 115 by operator's manipulation.

In a space Er inside the manufacturing factory, there are installed the equipment controller EC, the machine controllers MC1 to MC3, the process modules PM1 and PM2, and the load lock modules LLM and LLM2. The equipment controller EC holds a recipe that is used to etch a wafer W and generally control the machine controllers MC according to the recipe. The machine controllers MC1 to MC3 control the process modules PM, the load lock modules LLM, and the loader module LM, respectively, under the control of the equipment controller EC.

(Internal Structure of Plasma Processing System)

Figure 2:
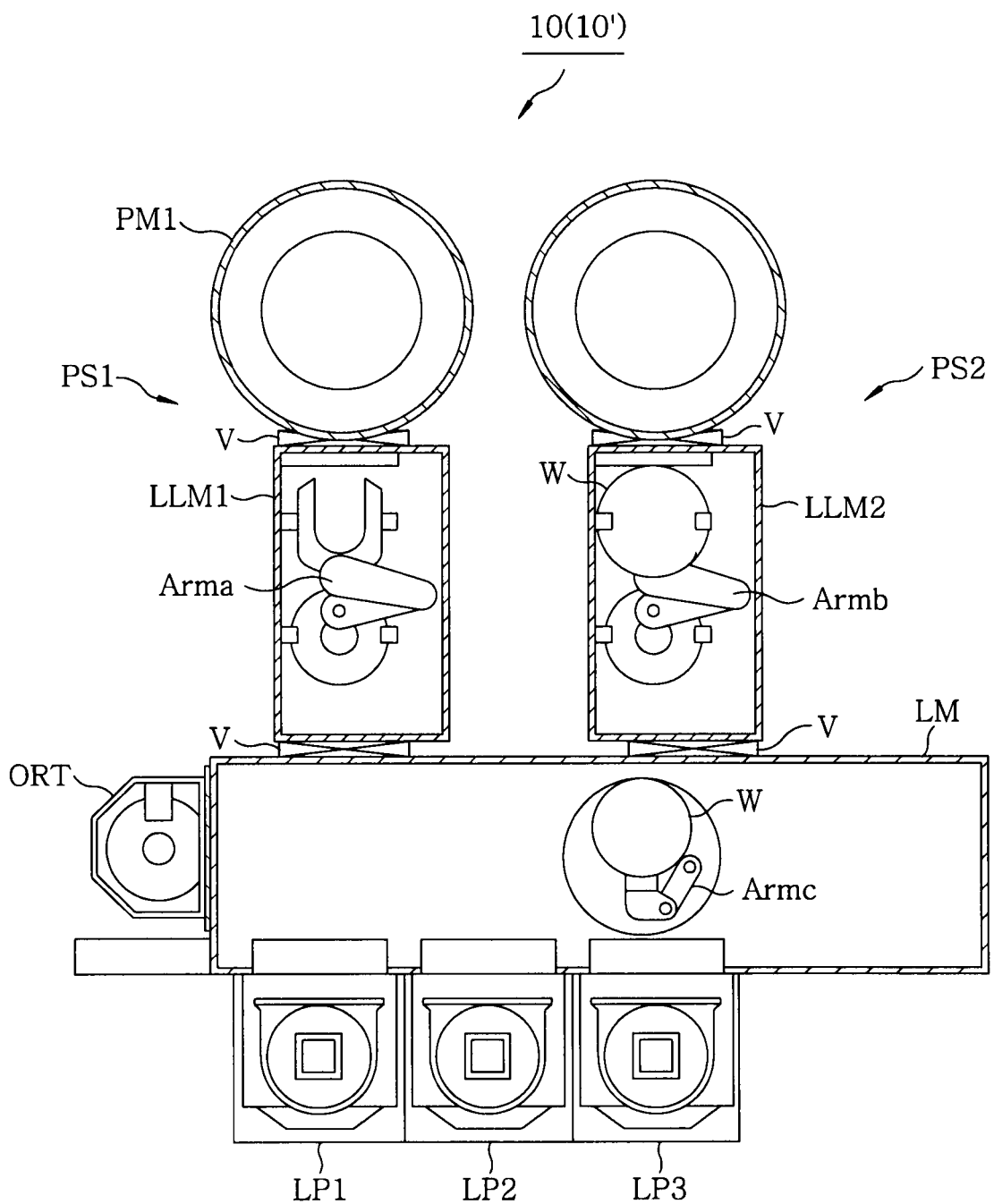
FIG. 2 shows an internal structure of the plasma processing system in accordance with the embodiments of the present invention.

The internal structure of the plasma processing system 10 will be described with reference to FIG. 2. The plasma processing system 10 includes a first process ship PS1, a second process ship PS2, an orientor ORT, and loading ports LP1 to LP3 (collectively referred to as LP).

The process ship PS1 includes the process module PM1 and the load lock module LLM1. The process ship PS2 includes the process module PM2 and the load lock module LLM2.

The load lock modules LLM 1 and LLM2 maintain the pressure of their inside in a depressurized state and transfers wafers from the atmospheric side to the vacuum side or vice versa. That is, the load lock modules LLM 1 and LLM2 control the pressure of their inside by opening or closing gate valves V provided at their opposite end portions, respectively, and transfer wafers W held by transfer arms Arma and Armb, respectively, between the process modules PM and the loader module LM.

The process modules PM1 and PM2 maintain their inside in a vacuum state and perform a predetermined plasma processing, e.g., the etching or the like, on the wafer transferred from the load lock modules LM1 and LLM.

The loading ports LP1 to LP3 are placed at a side portion of the loader module LM. A transfer arm Armc, which is placed in the loader module LM, cooperates with the transfer arms Arma and Armb of the load lock modules LLM1 and LLM2 to transfer desired wafers W accommodated in the loading ports LP1 to LP3.

The orientor ORT is placed at an end portion of the loader module LM to perform the position alignment of a wafer W. The position alignment of the wafer W is performed by rotating a turntable in the state where the wafer W is mounted thereon and allowing an optical sensor to detect the state of a peripheral portion of the wafer W.

With such configuration, the wafers W mounted on each of the loading ports LP pass through the loader module LM and undergo the position alignment in the orientor ORT. Then, the wafers W are alternately transferred to the process ships PS1 and PS2 one by one. Thereafter, the transferred wafers W undergo the plasma processing in the process modules PM1 and PM2, and then are accommodated in the loading port LP.

(Hardware Structure of Equipment Controller EC)

The hardware structure of the equipment controller EC will be described with reference with FIG. 3. The equipment controller EC is an example of the control device of a plasma processing system 10. The hardware structure of the machine controller MC is identical to that of the equipment controller EC, and therefore the description thereof will be omitted.

Figure 3:
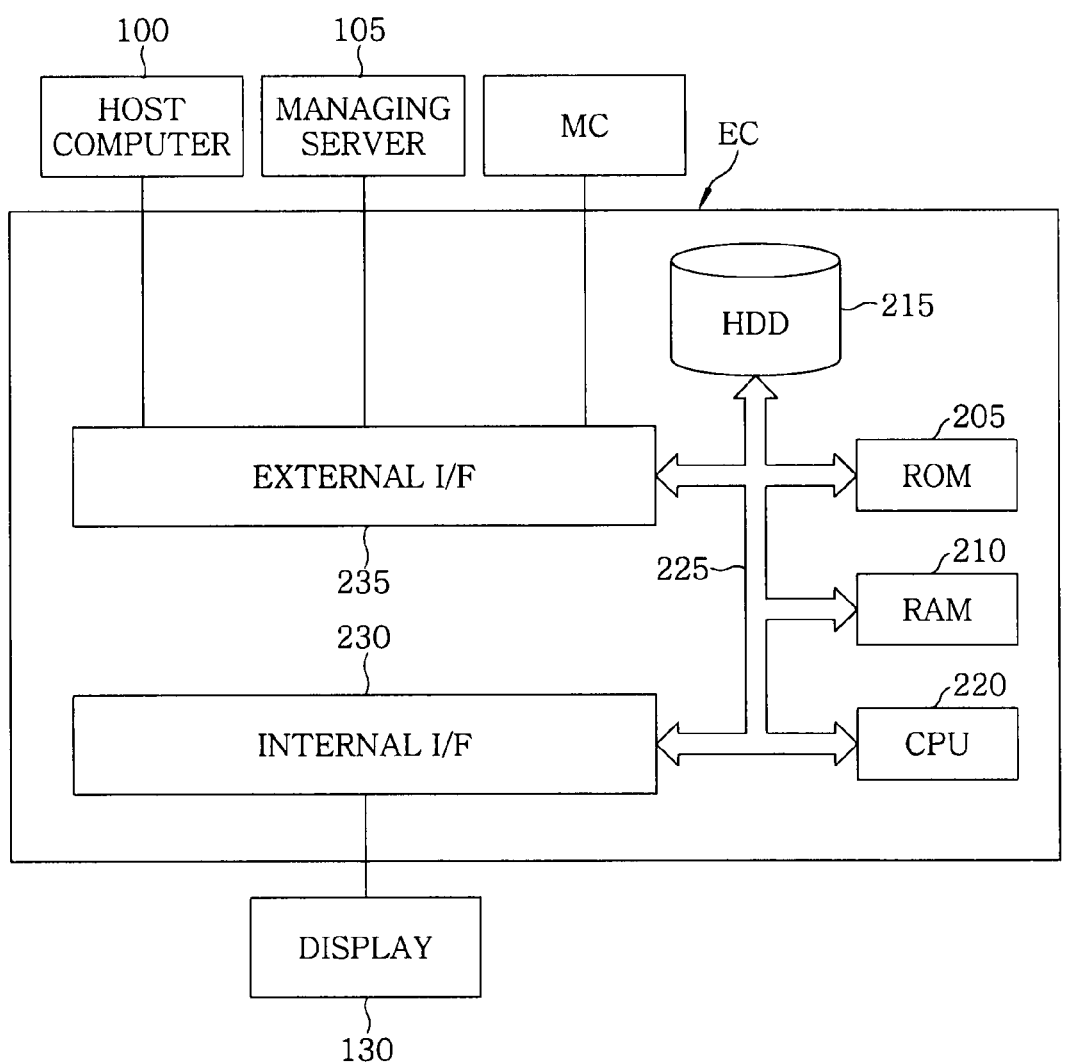
FIG. 3 shows a hardware structure of an equipment controller EC in accordance with the embodiments of the present invention.

As shown in FIG. 3, the equipment controller EC includes a ROM 205, a RAM 210, a HDD 215, a CPU 220, a bus 225, an internal interface 230, and an external interface 235. The ROM 205 and the RAM 210 store a control program, which is executable in a computer to control the plasma processing device 10, a program, which is executed when an error is made, various kinds of recipes, and various kinds of data. The ROM 205 and the RAM 210 are examples of a memory device. Instead, an electrically erasable programmable ROM (EEPROM), an optical disk or a magneto-optical disk may be used.

The HDD 215 stores log information related to the plasma processing system 10. The CPU 220 controls the adjustment of recipes or the processing or transferring of wafers according to the recipes. The bus 225 is used as a path for receiving and transmitting data between the ROM 205, the RAM 210, the HDD 215, the CPU 220, the internal interface 230 and the external interface 235. The internal interface 230 inputs pertinent data where desired information is displayed on a display 130. The external interface 235 transmits and receives data between the host computer 100, the managing server 105, and the machine controller MC.

(Functional Structure of Equipment Controller)

Figure 4:
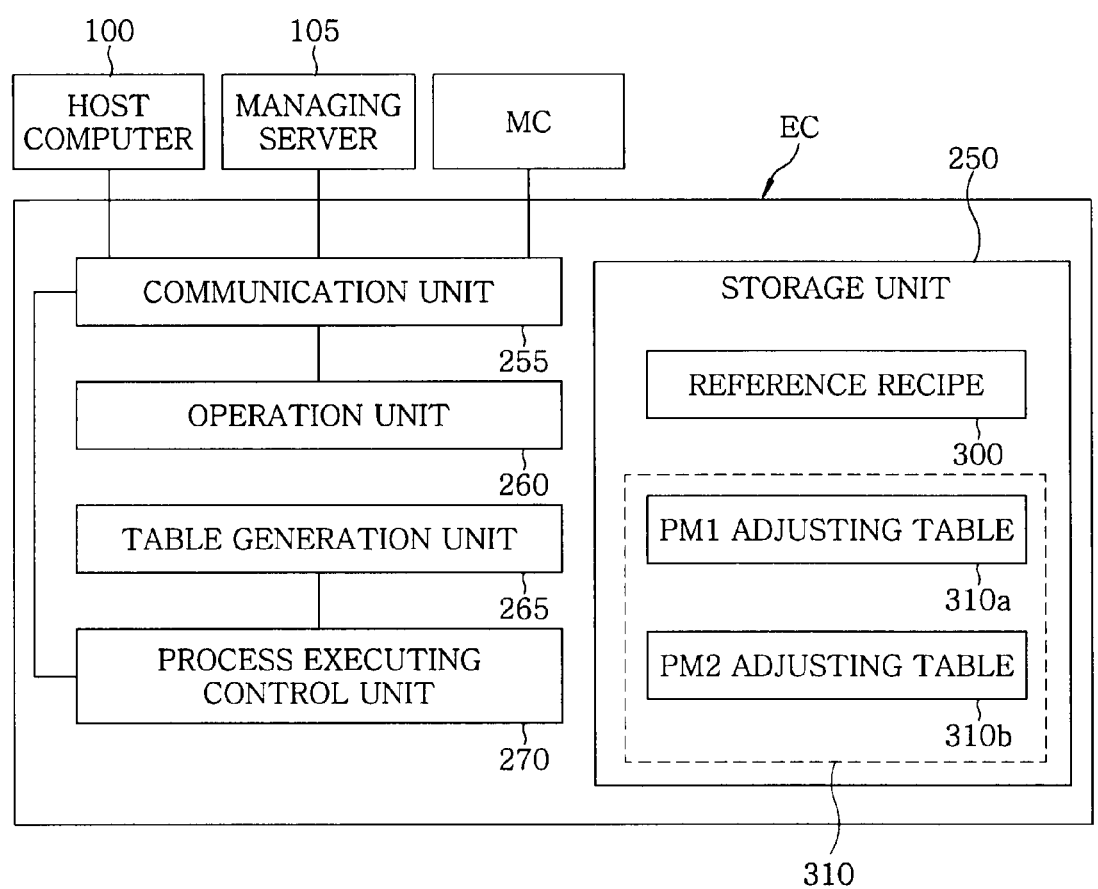
FIG. 4 shows a functional structure of an equipment controller EC in accordance with the first embodiment of the present invention.

The functional structure of the equipment controller EC will be described with reference to FIG. 4. The equipment controller EC has functions represented as each block of a storage unit 250, a communication unit 255, an operation unit 260, a table generation unit 265, and a process executing control unit 270.

The storage unit 250 stores a reference recipe 300 indicating the order for performing the etching and an adjusting table 310 for adjusting the reference recipe 300. The adjusting table 310 has a PM1 adjusting table 310a for the process module PM1 and a PM2 adjusting table 310b for the process module PM2.

The operation unit 260 calculates state variation values of the respective process modules PM1 and PM2 by a predetermined timing at a plurality of processing lot intervals. As an example which calculates the state variation value of the process module PM1 or PM2 by the predetermined timing, the operation unit 260 performs the plasma processing of a test wafer, after at least one of the cleaning and the seasoning, and then performs the plasma etching processing of the test wafer in the process module PM in order to calculate the state variation value of the process module PM from the etching status (e.g. etched amount or etching rate) of the processed test wafer.

The table generation unit 265 generates an adjusting table for adjusting the reference recipe 300 from the state variation value of the process module PM, calculated by the operation unit 260. The reason that the state inside the process module PM is changed is that a resist and/or wearable parts such as a focus ring are eroded and by-products are produced during the etching. Some by-products are gradually attached and accumulated on the inner wall of a processing space. As shown in the adjusting table 310 of FIG. 5, the state variation value of the process module PM is represented by percentage (%).

The adjusting table 310 sets ratios increasing or decreasing each process condition value set in the reference recipe 300 by, e.g., percentage for each process condition. For example, the adjusting table 310 regularly sets process condition values such as a radio frequency power RF of +10%, a pressure adjusting value of +20%, an etching time of −5%, . . . . In the case of the process module PM1 after the cleaning is performed, the table generation unit 265 generates the PM1 adjusting table 310a corresponding to the process module PM1.

The process executing control unit 270 adjusts the reference recipe 300 by using the adjusting tables 310 for the respective process modules PM, generated by the table generation unit 265. In the case of the process module PM1, for example, the process executing control unit 270 adjusts the process condition values of the reference recipe 300 by using the PM1 adjusting table 310a. Accordingly, the high frequency power RF of the reference recipe 300 shown in FIG. 5 is adjusted to output 1100 W in the STEP 1 and STEP 2 of the reference recipe 300 by the adjusting value, +10%, of the high frequency power RF of the adjusting table 310. The pressure is adjusted to output 150 mTorr in the STEP 1 and STEP 2 of the reference recipe 300.

The process executing control unit 270 transmits a command signal for performing the plasma processing of wafers to the machine controller MC according to the order of the adjusted reference recipe 300. In the case of the example of FIG. 5, an AO parameter table 320 sets parameter (output) resolutions of each hardware device. For example, 0 to 80,000 resolutions (0 to 5 voltages) is set in the radio frequency power RF (W) of a radio frequency power supply. Accordingly, the process executing control unit 270 sends a command signal to the machine controller MC to output the adjusted value, 1100 W, of the radio frequency power RF with the resolution set in the AO parameter table 320. Accordingly, the variation of the state inside processing spaces of the respective process modules PM can be absorbed by adjusting the reference recipe 300 by using the adjusting tables instead of changing the reference recipe 300. As a result, the plasma processing can be performed according to the variation of the state of each process module PM.

The communication unit 255 transmits and receives information to and from the host computer 100, the managing server 105, and the machine controller MC. For example, the communication unit 255 transmits a command for performing the etching to the machine controller MC. The communication unit 255 also transmits an equipment constant value (ECV) to the host computer 100 such that the host computer 100 can manage an adjusting value (%) of the adjusting table 310.

In fact, the above functions of the respective components of the equipment controller EC are accomplished by reading, analyzing, and executing control programs writing the processing orders of the components' functions which are to be executed by the CPU 220 shown in FIG. 3, stored in the ROM 205, the RAM 210, or the HDD 215. For example, in the first embodiment, the respective functions of the determination unit 255, the generation unit 260, and the process executing control unit 270 are accomplished by executing control programs that write the processing orders of the components' functions which are to be executed by the CPU 220.

(Operation of Equipment Controller)

Figure 6:
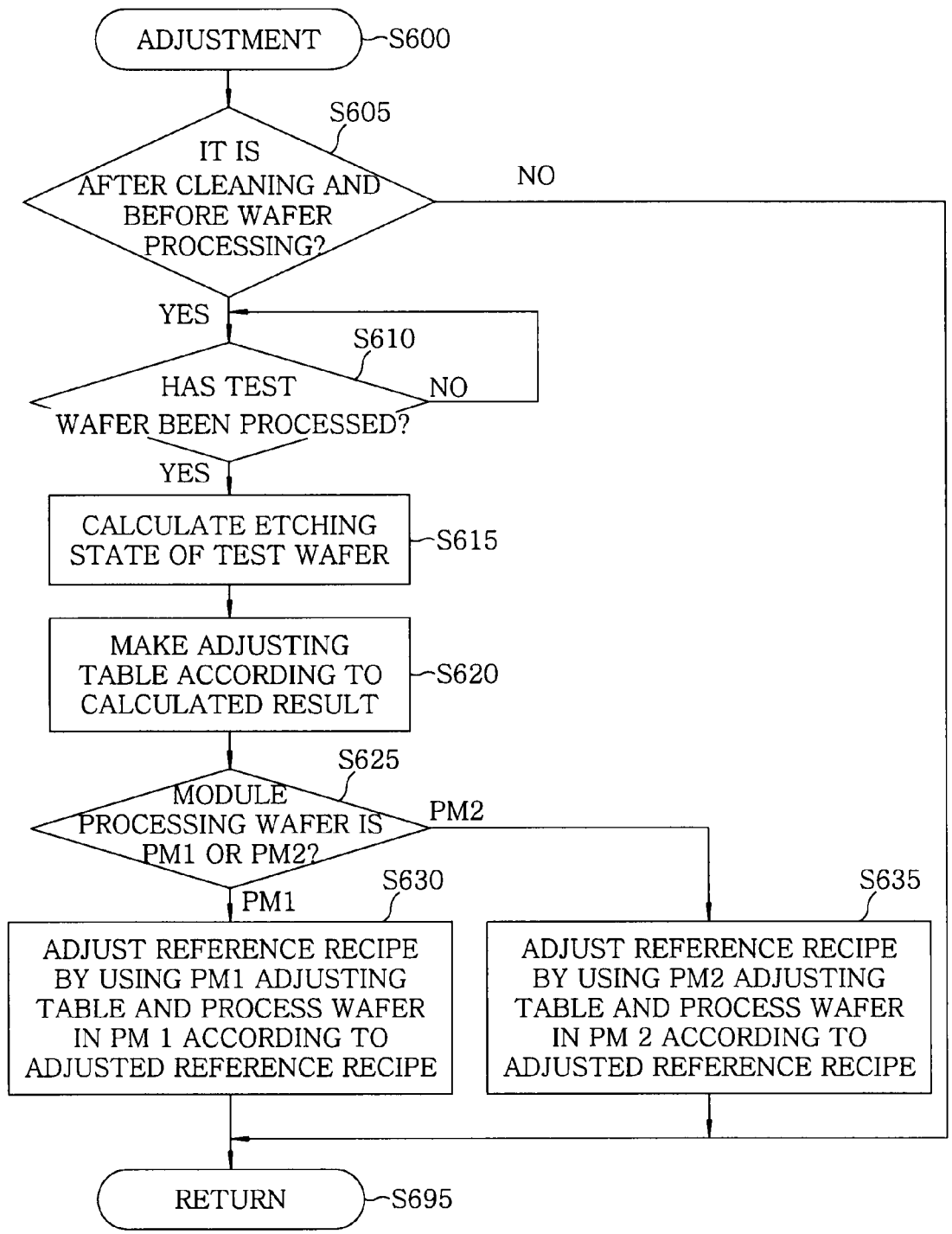
FIG. 6 is a flowchart showing an adjustment processing routine in accordance with the first embodiment of the present invention.

The process of adjustment performed by the equipment controller EC in accordance with the first embodiment of the present invention will be described by referring to the flowchart in FIG. 6. The process of adjustment in FIG. 6 is performed every preset period of time. The process of adjustment performs no seasoning after the cleaning of the process module PM.

(Process of Adjustment)

The process of adjustment is started in step S600. The operation unit 260 determines whether the process module PM1 or PM2 is after cleaning is performed and before wafers are processed in step S605. For example, in the case of the processing transition of the process module PM shown in FIG. 7, at the timing A, since the process module PM processes a wafer, the process goes to step S695 to be ended. On the other hand, at the timing B of FIG. 7, since the process module PM is after the cleaning is performed and before a wafer is processed, the operation unit 260 determines whether a test wafer has been processed in step S610. Since the test wafer has been processed at the timing B, the operation unit 260 calculates an etching status such as an etched amount, an etching rate, and the like according to the sectional shape of the test wafer measured by a measuring device (not shown) in step S615.

Then, the process goes to step S620 where the table generation unit 265 generates the adjusting table 310 on a basis of the calculated result of the etching status of the test wafer. Thereafter, the process executing control unit 270 determines which one of the process modules PM1 and PM2 processes a wafer in step S625. For example, in the case that the process module PM1 processes a wafer at the timing B of FIG. 7, the process executing control unit 270 adjusts the reference recipe 300 by using the PM1 adjusting table 310*a* and the wafer is processed in the process module PM1 according to the order of the adjusted reference recipe 300 in step S630. Then, the process goes to the step S695 to be ended.

If the process module PM2 processes a wafer at the timing B, the process goes to step S635 where the process executing control unit 270 adjusts the reference recipe 300 by using the PM2 adjusting table 310*b* and the wafer is processed in the process module PM2 according to the order of the adjusted reference recipe 300. Then, the process is ended in the step S695.

Figure 7:
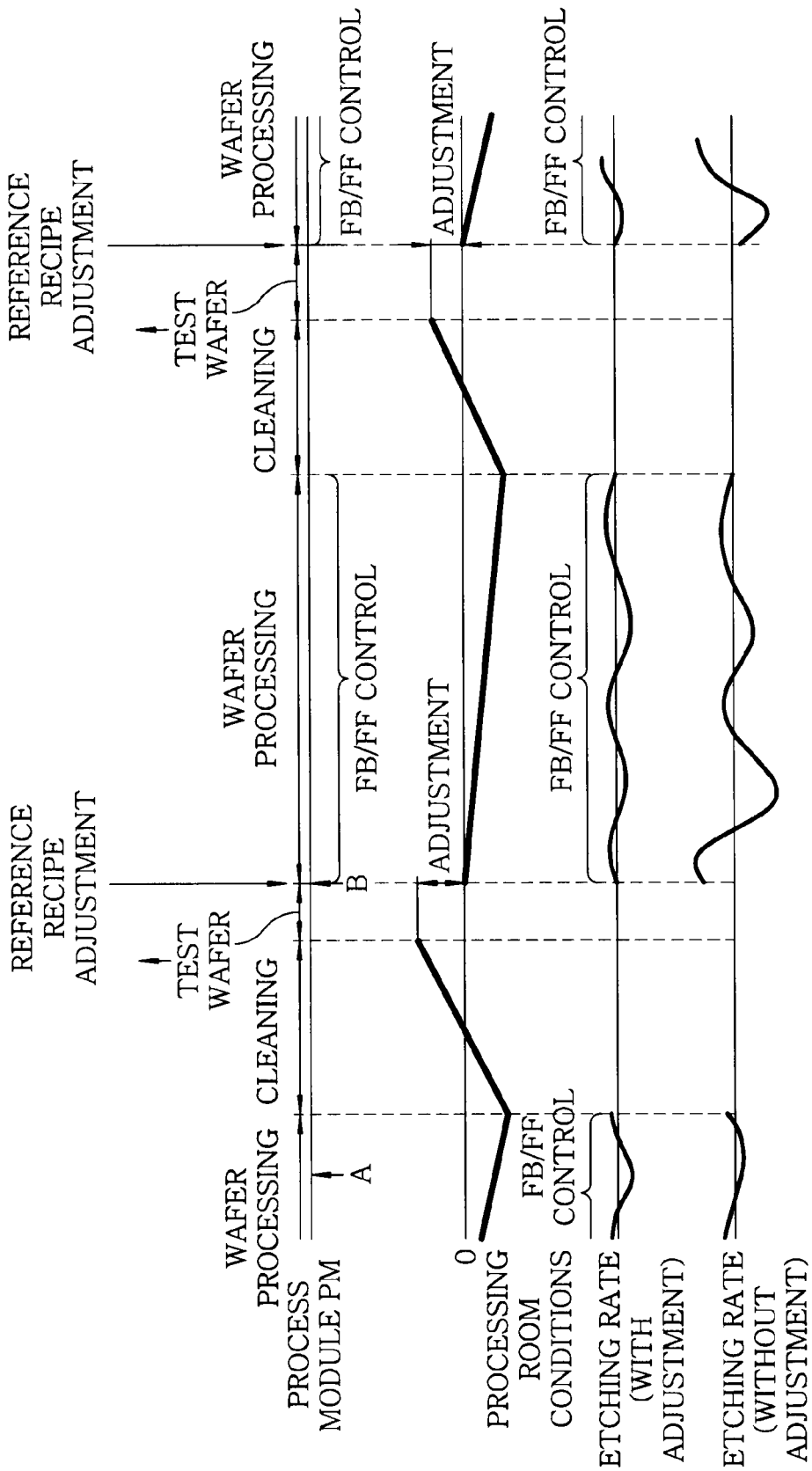
FIG. 7 shows how processing and state transition is performed in a process module in accordance with the first embodiment of the present invention.

In this case, if it is assumed that an initial state inside a processing space is "0," the state inside the processing space shown in FIG. 7 becomes different from the initial state according to the corroded state of hardware devices or the state of accumulation as described above when the wafer is processed and the cleaning is performed. The reference recipe 300 has a fixed value per process condition according to the initial state of the process module PM. Accordingly, the process module PM adjusts the difference between the present state and the initial state of the processing space of the reference recipe 300 to meet a reference state by using the adjusting table 310 before processing the wafer according to the order of the process of adjustment shown in FIG. 7. Thus, the wafer can be processed without changing the reference recipe 300 by adjusting the reference recipe 300 with the adjusting table 310. As a result, it is possible to avoid the troublesomeness that it is necessary to manage a plurality of recipes according to the variations of state inside the processing space.

As shown in the lower side of FIG. 7, when the reference recipe 300 is not adjusted by the adjusting table 310 (etching rate: without adjustment), the variation of the state inside the processing space may affect the etching characteristic of the processed wafer. Even though fine adjustment is performed in feedback/feedforward (FB/FF) control, the etching characteristics of the wafer may become unstable until the relatively great variation of the state inside the processing space is absorbed, thereby obtaining an insufficient plasma processing result. In contrast, when the reference recipe 300 is adjusted by the adjusting table 310 (etching rate: with adjustment), since the data of the reference recipe 300 as well as the variation of the state inside the processing space is adjusted, the influence of the variation of the processing space on the etching characteristic of the wafer becomes smaller and the FB/FF control also becomes better. As a result, a desired etching characteristic can be obtained with high accuracy.

The adjusting table 310 adjusts a relatively great variation of the state inside the processing space whenever the cleaning or the like is performed, while the FB/FF control performs the fine adjustment of the state of the processing space per wafer or lot. Accordingly, the table generation unit 265 does not update the adjusting table until next cleaning (or seasoning) of each process module PM. Here, the FB/FF control is performed per wafer or lot.

(Monitor Output)

Figure 8:
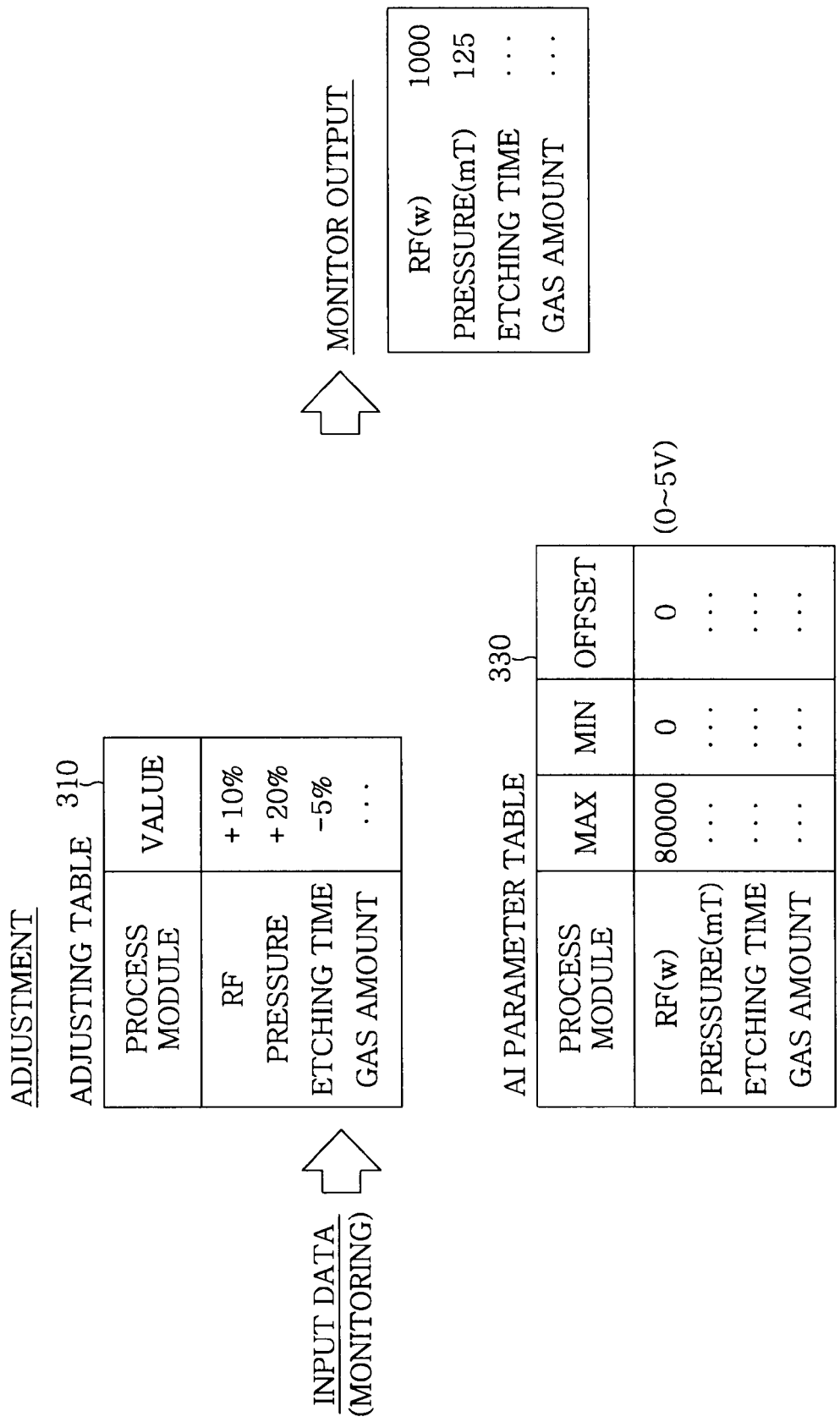
FIG. 8 shows monitor output in accordance with the first embodiment of the present invention.

When monitor output is performed through the host computer 100 or a display in the manufacturing factory, the process executing control unit 270 inputs output data outputted by adjusting the reference recipe 300 (refer to FIG. 5) as shown in FIG. 8 (monitoring) and adjusts the adjusted output data back to the original values of the reference recipe 300 by using the adjusting table 310 and the resolution of the AI parameter table 330 to perform the monitor output. For example, when the wafer is processed, the radio frequency power RF is adjusted from the original value 1000 W of the reference recipe 300 to a 10%-increased value 1100 W. As a result, the radio frequency power of 1100 W is outputted from a radio frequency power supply. In the monitoring, however, if the 10%-increased value 1100 W is inputted, the value 1100 W is adjusted back to a 10%-decreased value 1000 W. As a result, the value 1000 W is outputted through the monitor. Accordingly, an operator can check that the etching is being performed as scheduled on a basis of the reference recipe 300 without recognizing the variations of the process module PM.

(Second Embodiment)

Figure 9:
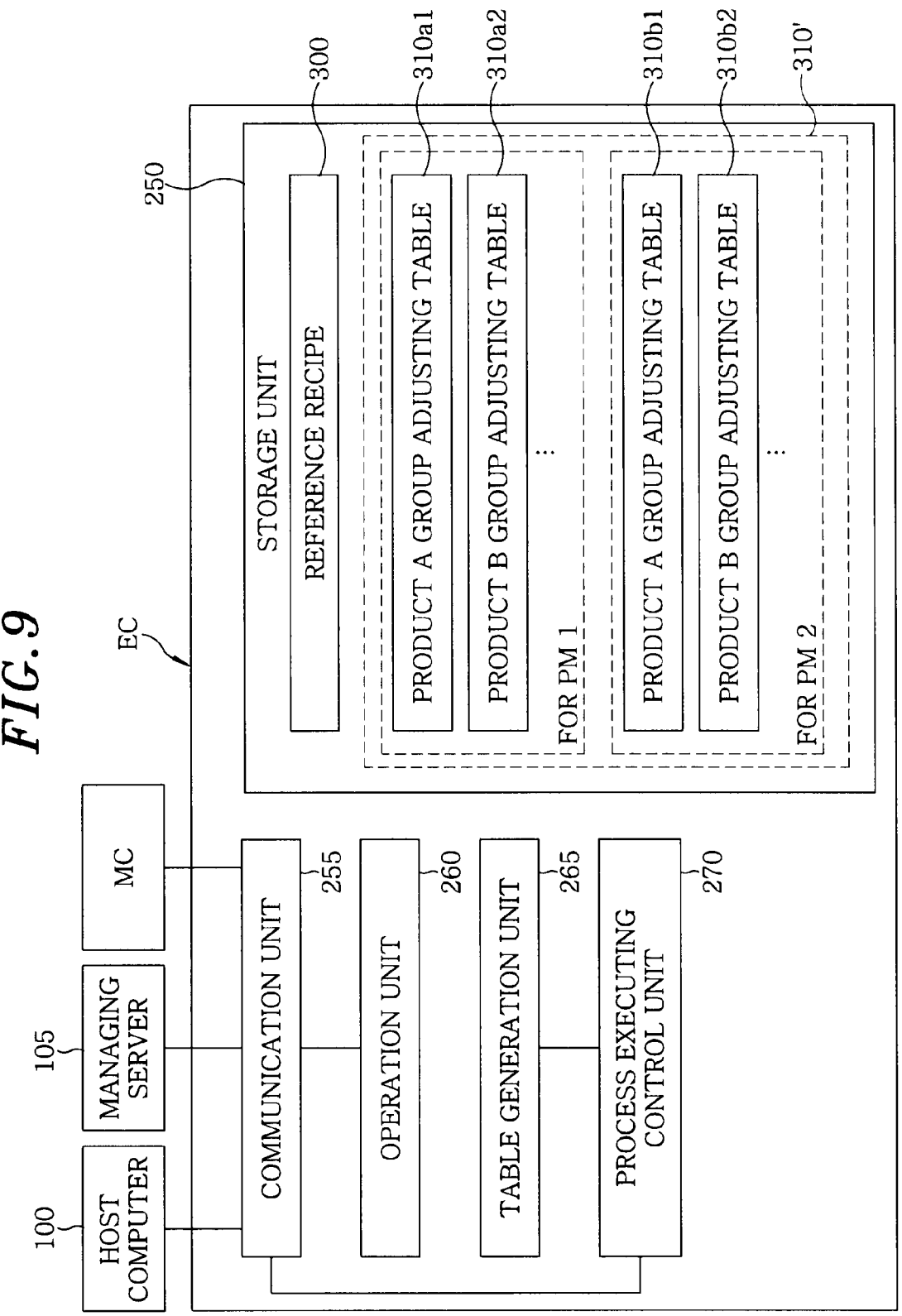
FIG. 9 shows a functional structure of an equipment controller EC in accordance with the second embodiment of the present invention.

A plasma processing system 10' in accordance with a second embodiment of the present invention will be described with reference to FIG. 9. The plasma processing system 10' in accordance with the second embodiment of the present invention features the difference that a plurality of adjusting tables grouped depending on kinds of wafers W is generated per process module PM from the plasma processing system 10 in accordance with the first embodiment of the present invention generating the adjusting tables per process module PM regardless of kinds of wafers W. Accordingly, the difference of the plasma processing system 10' will be mainly described.

In the second embodiment of the present invention, the table generation unit 265 generates a plurality of adjusting tables 310' grouped depending on kinds of wafers W per process module PM. For example, the table generation unit 265 generates a product A group adjusting table 310*a*1, a product B group adjusting table 320*a*2, . . . for the process module PM1, a product A group adjusting table 310*b*1, a product B group adjusting table 320*b*2, . . . for a process module PM2, . . . . The storage unit 250 categorizes and stores the generated adjusting tables by product group.

(Operation of Equipment Controller)

Figure 10:
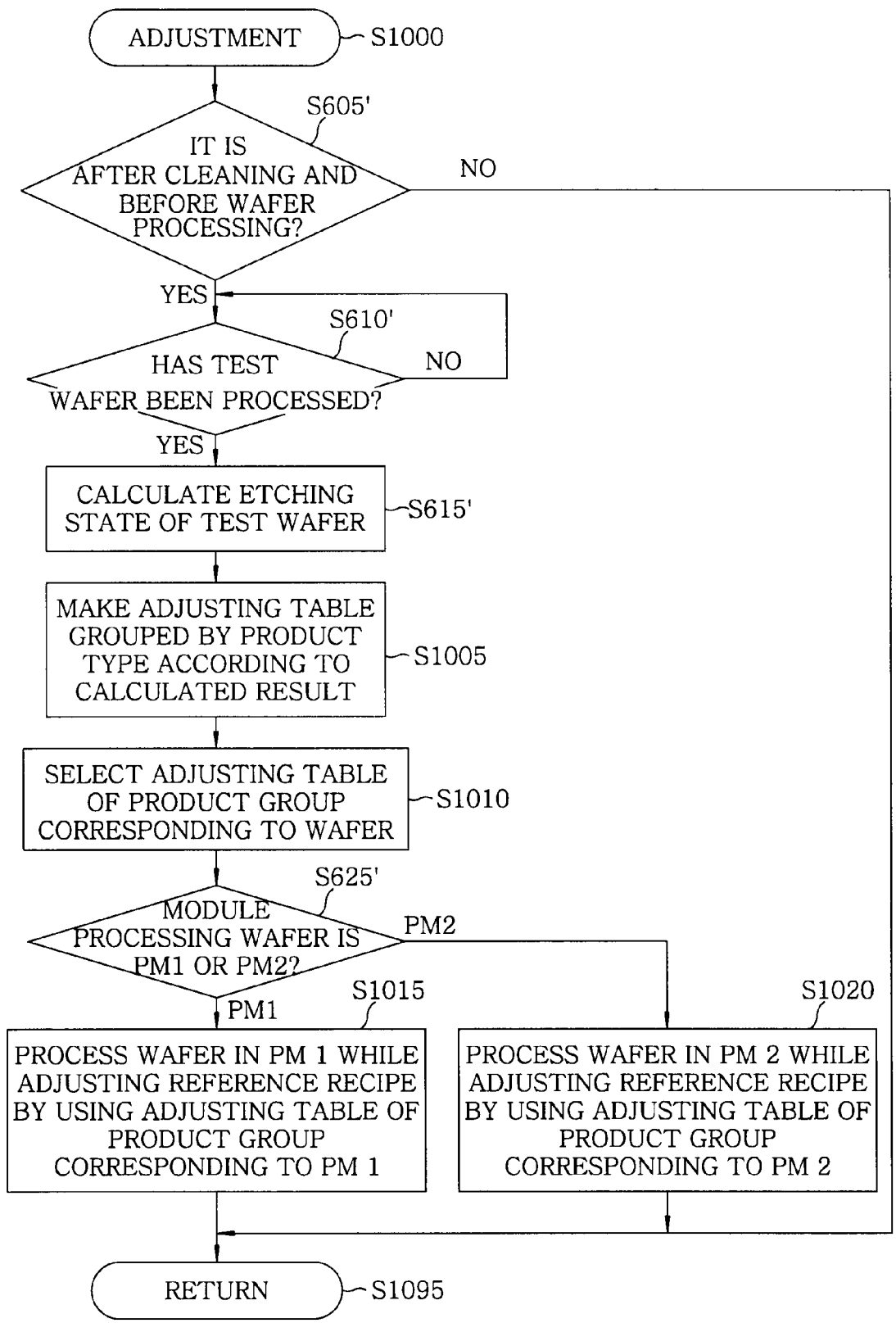
FIG. 10 is a flowchart showing an adjustment processing routine in accordance with the second embodiment of the present invention.
Figure 11:
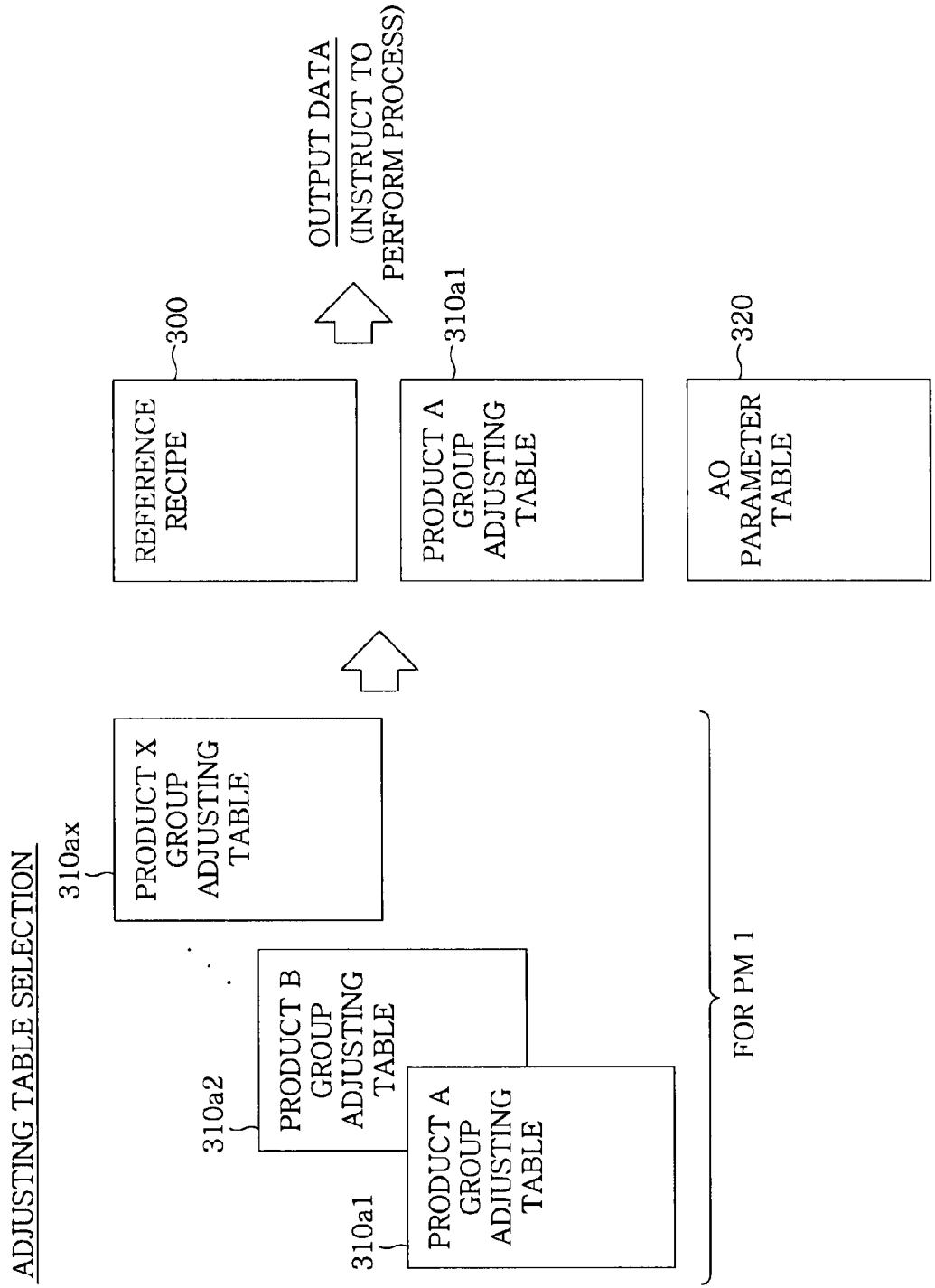
FIG. 11 shows how adjustment of recipes is performed by an adjusting table in accordance with the second embodiment of the present invention.

The process of adjustment according to the second embodiment of the present invention will be described with reference to a flowchart shown in FIG. 10. The process of adjustment in FIG. 10 is performed every preset period of time. The process of adjustment performs no seasoning after the cleaning of the process module PM.

(Process of Adjustment)

The process of adjustment is started in step S1000. The process goes to step S605' where the operation unit 260 determines whether the process module PM1 or PM2 is after cleaning is performed and before wafers are processed. Then, the operation unit 260 determines whether a test wafer has been processed in step S610'. If it is determined that the process module PM1 or PM2 is after cleaning is performed and before wafers are processed in the step S605' and the test wafer has been processed in the step S610', the operation unit 260 calculates an etching status such as an etched amount, an etching rate, and the like according to the sectional shape of the test wafer measured by a measuring device (not shown) in step S615'.

Then, the process goes to step S1005 where the table generation unit 265 generates the adjusting tables 310' grouped depending on the kinds of wafers W on a basis of the calculated result of the etching status of the test wafer. Thereafter, the process executing control unit 270 selects an adjusting table for a product group pertaining to the wafer W in step S1010. For example, in the case of the plasma-processed wafers W pertaining to the product group A, the process executing control unit 270 selects the product A group adjusting table 310a1 from the product A group adjusting table 310a1, the product B group adjusting table 310a2, ..., and a product X group adjusting table 310ax for the process module PM1.

Then, the process goes to step S625' where the process executing control unit 270 determines which one of the process modules PM1 and PM2 processes the wafer W. If the process module PM1 processes the wafer W, the process goes to step S1015 where the process executing control unit 270 allows the process module PM1 to process the wafer W while adjusting the reference recipe 300 with the product A group adjusting table 310a1 for the process module PM1. Then, the process is ended in step S1095.

If the process module PM2 processes the wafer W, the process goes to step S1020 where the process executing control unit 270 allows the process module PM2 to process the wafer W while adjusting the reference recipe 300 by using the product A group adjusting table 310b1 for the process module PM2. Then, the process is ended in the step S1095.

As described above, in the second embodiment of the present invention, the table generation unit 265 generates the adjusting tables 310' grouped depending on the kinds of the wafers W. The adjusting tables 310' grouped depending on the kinds of the wafers W refer to the tables for more adequately adjusting a group affected by the same influence resulted from a temporal change of the state of a processing space per process module PM. Accordingly, even though it is more difficult to change the plasma processing with respect to a temporal change in the state of the processing space, it is possible to perform the plasma processing by adjusting the reference recipe 300 by use of an adjusting tables pertaining to the wafer W.

In accordance with the first and second embodiments of the present invention, the table generation unit 265 sets the ratios increasing or decreasing each process condition value set in the reference recipe 300 in the adjusting tables 310' per process condition by percentage. Alternatively, the ratios increasing or decreasing each process condition value may be set in the adjusting tables 310' per step (i.e. STEP1, STEP2, and the like) of the process condition. In this case, it is possible to adjust the reference recipe 300 by using the corresponding adjusting value per step of the adjusting table 310' pertaining to the wafer W that is to be processed successively. This can make it possible to perform a plasma processing on the wafer W, the plasma processing being more and more difficult to be changed with respect to a temporal change in the state of the processing space.

In each embodiment of the present invention, the operations of the components are related to each other, and it is possible to change the respective operations of the components into a series of operations in consideration of their relationships. Accordingly, the embodiments of the control device of the plasma processing system can be changed into those of the control method of the plasma processing system. Moreover, the embodiments of the control method of the plasma processing system can be considered as the embodiments of the storage medium storing the control program executable in a computer, which controls the plasma processing system.

In accordance with the embodiments of the present invention, it is possible to easily manage the recipes of the control devices of the plasma processing devices. While the invention has been shown and described with respect to the embodiments, it will be understood by those skilled in the art that various changes and modification may be made without departing from the scope of the invention as defined in the following claims.

For example, the control device the present invention may be realized by using the equipment controller EC only, or by using the equipment controller EC and the machine controller MC. Here, one or more equipment controllers may be used.

The plasma processing device, which performs the plasma processing on a target object, may be a plasma etching device, a plasma CVD device, an ashing device, or a sputtering device. The target object includes a silicon wafer or a substrate.

What is claimed is:

1. A control device of a plasma processing system, which performs plasma processing on target objects in processing spaces of a plurality of plasma processing devices, the control device comprising:

a storage unit, configured to store a reference recipe indicating an order of the plasma processing, said reference recipe being utilized in each of the plurality of plasma processing devices;

an operation unit, configured to calculate a state variation value of each of the plurality of plasma processing devices by a predetermined timing at a plurality of processing lot intervals;

a table generation unit, configured to generate a plurality of adjusting tables, one for each of the plurality of plasma processing devices, that adjust the reference recipe by using the calculated state variation value of each of the plurality of plasma processing devices, respectively; and a process executing control unit, configured to adjust the reference recipe for each of the plurality of plasma processing devices by using the plurality of adjusting tables for the plasma processing devices, respectively, and to perform the plasma processing of the target objects in the plurality of plasma processing devices according to the reference recipe having been adjusted for each of the plurality of plasma processing devices with the plurality of adjusting tables, respectively.

2. The control device of claim 1, wherein, posterior to performing at least one of cleaning and seasoning and prior to processing the target objects, the operation unit calculates the state variation value of the respective plasma processing devices.

3. The control device of claim 1, wherein the table generation unit generates the adjusting tables which are grouped depending on kinds of the target objects, and the process executing control unit adjusts the reference recipe by using an adjusting table, pertaining to a target object that is to be processed successively, of the grouped adjusting tables and performs the plasma processing in the corresponding plasma processing device according to an order of the adjusted reference recipe.

4. The control device of claim 1, wherein the table generation unit sets ratios, increasing or decreasing process condition values set in the reference recipe, per process condition in the adjusting tables.

5. The control device of claim 1, wherein the table generation unit sets ratios, increasing or decreasing process condition values set in the reference recipe, per step of process condition in the adjusting tables.

6. The control device of claim 1, wherein the table generation unit does not update the adjusting tables until next cleaning or seasoning of the respective plasma processing devices.

7. The control device of claim 1, wherein the plasma processing is plasma etching.

8. The control device of claim 7, wherein, if the plasma etching of a test-target object is performed in a plasma processing device posterior to performing cleaning or seasoning, the operation unit calculates the state variation value of the plasma processing device from the etched status of the test-target object.

9. A control method of a plasma processing system, which performs plasma processing of target objects in processing spaces of a plurality of plasma processing devices, the control method comprising:

storing a reference recipe indicating an order of the plasma processing in a storage unit, said reference recipe being utilized in each of the plurality of plasma processing devices;

calculating a state variation value of each of the plurality of plasma processing devices by a predetermined timing at a plurality of processing lot intervals;

generating a plurality of adjusting tables, one for each of the plurality of plasma processing devices, for adjusting the reference recipe by using the calculated state variation value of each of the plurality of plasma processing devices, respectively; and adjusting the reference recipe for each of the plurality of plasma processing devices by using the plurality of adjusting tables for the plurality of plasma processing devices, respectively, and performing the plasma processing of the target objects in the plurality of plasma processing devices according to the reference recipe having been adjusted for each of the plurality of plasma processing devices with the plurality of adjusting tables, respectively.

10. A non-transitory storage medium storing a computer-executable instructions, which when executed by a computer causes the computer to perform a method of plasma processing target objects in processing spaces of a plurality of plasma processing devices, the method comprising:

storing a reference recipe indicating an order of the plasma processing in a storage unit, said reference recipe being utilized in each of the plurality of plasma processing devices;

calculating a state variation value of each of the plurality of plasma processing devices by a predetermined timing at a plurality of processing lot intervals;

generating a plurality of adjusting tables, one for each of the plurality of plasma processing devices, for adjusting the reference recipe by using the calculated state variation value of each of the plurality of plasma processing devices, respectively; and adjusting the reference recipe for each of the plurality of plasma processing devices by using the plurality of adjusting tables for the plurality of plasma processing devices, respectively, and performing the plasma processing of the target objects in the plurality of plasma processing devices according to the reference recipe having been adjusted for each of the plurality of plasma processing devices with the plurality of adjusting tables, respectively.

* * * * *